(12) United States Patent
Koutsabeloulis et al.

(10) Patent No.: US 8,271,243 B2
(45) Date of Patent: Sep. 18, 2012

(54) SYSTEM AND METHOD OF INTEGRATING SUBTERRANEAN COMPUTER MODELS FOR OIL AND GAS EXPLORATION

(75) Inventors: Nikolaos Constantinos Koutsabeloulis, Winkfield-Windsor (GB); Stephen Alexander Hope, Staines (GB); John Fuller, Farnham (GB); Melissa Suman, Windsor (GB); Thomas Hantschel, Aldenhoven (DE); Michael De Lind Van Wijngaarden, Aachen (DE); Ian David Bryant, Houston, TX (US); Rodney Laver, Crawley Down (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 389 days.

(21) Appl. No.: 12/693,813

(22) Filed: Jan. 26, 2010

(65) Prior Publication Data
US 2010/0211367 A1 Aug. 19, 2010

Related U.S. Application Data

(60) Provisional application No. 61/153,008, filed on Feb. 17, 2009.

(51) Int. Cl.
*G06G 7/48* (2006.01)
(52) U.S. Cl. .................................. 703/6; 703/10; 702/11
(58) Field of Classification Search ........................ 703/6
See application file for complete search history.

(56) References Cited

U.S. PATENT DOCUMENTS

| 7,177,764 | B2* | 2/2007 | Stone .................................. 702/6 |
| 7,181,380 | B2* | 2/2007 | Dusterhoft et al. ............. 703/10 |
| 7,472,022 | B2 | 12/2008 | Birchwood |
| 8,150,669 | B2* | 4/2012 | Cacas et al. ..................... 703/10 |
| 2002/0013687 | A1* | 1/2002 | Ortoleva ......................... 703/10 |
| 2010/0223039 | A1* | 9/2010 | Maliassov ........................ 703/2 |

FOREIGN PATENT DOCUMENTS

WO 00/60379 10/2000

OTHER PUBLICATIONS

Onaisi et al, "Management of Stress Sensitive Reservoirs Using Two Coupled Stress-Reservoir Simulation Tools: ECL2VIS and ATH2VIS", SPE 78512, 2002.*

Tran et al, "New Iterative Coupling Between a Reservoir Simulator and a Geomechanics Module", SPE 88989, 2004.*

(Continued)

*Primary Examiner* — Mary C Jacob
(74) *Attorney, Agent, or Firm* — Colin Wier

(57) ABSTRACT

The invention provides a system and method for integrating petroleum system and geomechanical computer models for use in oil and gas exploration. In one embodiment, the invention provides a petroleum system model capable of analyzing data relating to a subterranean formation and calculating the geometry and geochemistry of each layer of the formation through geologic time. The present invention also provides a geomechanical model in communication with the petroleum system model such that information concerning each layer of the subterranean formation may be shared and cross-referenced as an iterative operation prior to the analysis of subsequent layers. At each step of the iterative operation, results are calculated, validated, and cross-referenced in order to produce improved reliability estimates of petroleum charge and mechanical seal integrity for the subterranean formation.

21 Claims, 3 Drawing Sheets

OTHER PUBLICATIONS

Baur et al, "Integrating Structural Geology and Petroleum Systems Modeling-A Pilot Project from Bolivia's Fold and Thrust Belt", Marine and Petroleum Geology, 26, pp. 573-579, available online Jan. 15, 2009.*

Settari et al, "Geomechanics in Integrated Reservoir Modeling" OTC 19530, Offshore Technology Conference, May 2008.*

Rodrigues et al, "Incorporating Geomechanics Into Petroleum Reservoir Numerical Simulation", SPE 107952, 2007.*

Kristiansen, et al., "Linking seismic response to geo-mechanics", Geo ExPro Newsletter; downloaded from the Internet on May 21, 2010 at http://www.geoexpro.com/recentadvances/linkingseismic/ see paragraph "Linking 4D seismic observations and rock mechanics".

Koutsabeloulis, et al., "Coupled geo-mechanics predicts well failures", E&P, Nov. 1, 2007, downloaded from the Internet on May 21, 2010 at http://www.epmag.com/archives/features/764.htm see whole document.

* cited by examiner

SYSTEM AND METHOD OF INTEGRATING SUBTERRANEAN COMPUTER MODELS FOR OIL AND GAS EXPLORATION

CROSS REFERENCE TO RELATED APPLICATIONS

This patent application claims priority upon and incorporates by reference herein, a provisional patent application entitled "Method and System for Integrating Petroleum System and Geomechanical Models," filed on Feb. 17, 2009, Ser. No. 61/153,008.

FIELD OF THE INVENTION

The present invention relates generally to petroleum exploration and, more particularly, to systems and methods of integrating petroleum system and geomechanical computer models.

BACKGROUND OF THE INVENTION

Computer modeling and simulation of subterranean conditions is a vital component of oil and gas exploration. Petroleum system modeling, also referred to as "charge modeling," is the analysis of geological and geophysical data related to the petroleum potential of a subterranean prospect or play. Petroleum system models may be 1D, 2D, or 3D geologic models covering areas ranging from a single charge area for a prospect to mega-regional studies of entire basins.

Petroleum system models can predict if, and how, a reservoir has been charged with hydrocarbons, including the source and timing of hydrocarbon generation, migration routes, quantities, and hydrocarbon type. Petroleum system models include the quantitative analysis and simulation of geological processes in sedimentary basins on a geological timescale. It further encompasses geometric development of the basin, heat and pore water flow modeling with regard to sediment compaction and basin subsidence or uplift, and the temperature-controlled chemistry of mineral and organic matter changes. Petroleum system models may be used to simulate processes related to the generation, migration, accumulation and loss of oil and gas, thereby leading to an improved understanding and predictability of their distribution and properties.

Geomechanics is the science of the way rocks compress, expand and fracture. Over the geological timescale of a prospect or play, sediments are deposited, compacted, lithified, and deformed by tectonic events to produce layers of rocks with highly anisotropic and nonlinear mechanical characteristics. Where reservoirs exist, the fluids they contain, the reservoir rocks themselves, and the formations that surround them form intimately coupled systems.

Geomechanical models use calculated pressure, temperature, and saturation to calculate the behavior of the formation rock through geologic time. By relating rock stresses to reservoir properties, the geomechanical model enables the development of mechanical earth models that predict the geomechanical behavior of the formation during production and injection. The removal of hydrocarbons from a reservoir or the injection of fluids changes the rock stresses and geomechanics environment, potentially affecting compaction and subsidence, well and completion integrity, cap-rock and fault-seal integrity, fracture behavior, thermal recovery, and carbon dioxide disposal.

There remains a need for a computer modeling system and method that integrates the functionality of petroleum system modeling and geomechanical modeling for use in oil and gas exploration.

SUMMARY OF THE INVENTION

Accordingly, the present invention provides a system and method for integrating petroleum system and geomechanical computer models for use in oil and gas exploration. In one embodiment, the invention provides a petroleum system model capable of analyzing data relating to a subterranean formation and calculating the geometry of each layer of the formation through geologic time. The geometry of each layer is used to determine the geochemical conditions present in each layer, i.e., the presence and location of oil and gas deposits.

The present invention also provides a geomechanical model capable of interacting with the petroleum system model with respect to each geologic time step of the formation. In one embodiment, the geomechanical model is in communication with the petroleum system model such that data concerning each layer of the subterranean formation may be shared and cross-referenced as an iterative operation prior to the analysis of subsequent layers. At each step of the iterative operation, results are calculated, validated, and cross-referenced. By cross-referencing results for each layer of the subterranean formation, improved reliability estimates of petroleum charge and mechanical seal integrity for geological features may be produced.

In one embodiment, the present invention utilizes a validation process applying one or more user-defined convergence thresholds. If such threshold(s) are not met during analysis of a particular geometric time step, the analysis of the layer at issue may be repeated through iteration until the desired convergence is reached.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; it being understood that the drawings contained herein are not necessarily drawn to scale; wherein.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible. Further, the following description is directed to the analysis of the first and second layers of the subterranean formation for ease of understanding. The present invention is not limited to use in conjunction with the layers described in the examples below, and may be used in conjunction with any one or more layers of the formation.

Figure 1:
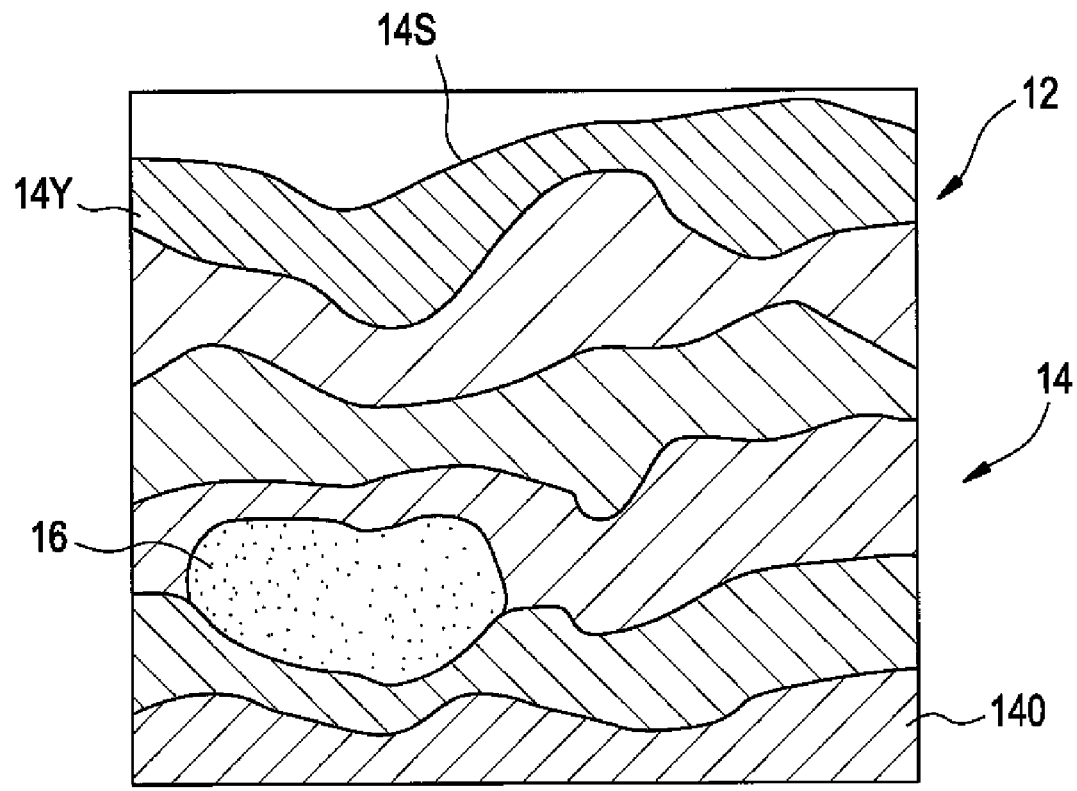
FIG. 1 is a two dimensional representation of an example subterranean formation.

The present invention is herein described as a method of modeling a subterranean formation, as a computer-readable storage medium for modeling a subterranean formation, and as a subterranean modeling system. FIG. 1 provides an example two dimensional representation of a subterranean formation (12). The subterranean formation, or subsurface underground, is composed of different layers (14) of subsurface material deposited, compacted, or otherwise tectonically deformed or displaced over periods of geological time. Each layer (14) represents the composition of the formation during a particular geologic time period. In this example, the youngest layer (14Y) is usually positioned closest to the surface (14S) of the subterranean formation (12), while the oldest layer (14O) is usually located at the bottom of the formation.

Geologic representations, such as that of FIG. 1, are generated using seismic data, well data, and other geologic knowledge collected with respect to each layer of the subterranean formation through geologic time, including the predicted location of oil and gas deposits (16). Such representations are utilized by various computer modeling programs used in the oil and gas industry.

Figure 2:
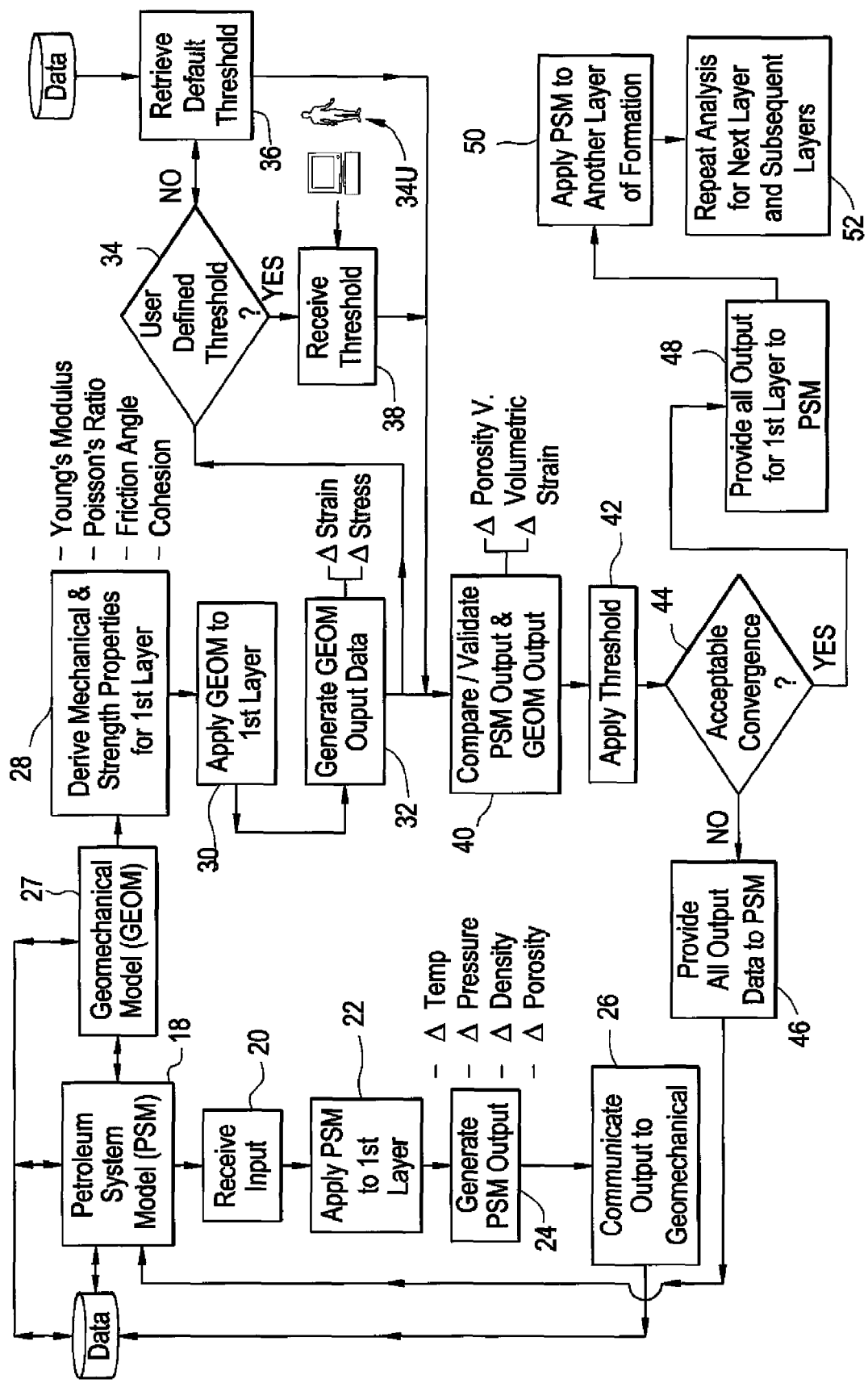
FIG. 2 is a flowchart diagram illustrating the subterranean computer model integration process of one embodiment of the present invention.

Referring to FIG. 2, the present invention utilizes at least one petroleum system model, illustrated by Box (18). One example of a petroleum system model is PETROMOD™ software offered by Schlumberger. The petroleum system model utilized by the present invention is capable of analyzing geological and geophysical data relating to the petroleum potential of a subterranean formation. Upon receiving input data relating to the subterranean formation, the petroleum system model assimilates available data concerning the subterranean formation and calculates horizon geometries together with changes in vertical stress, pressure, porosity, density, and temperature for the first layer of the formation, as illustrated by Boxes (20), (22), and (24). Input data may include any available data concerning the first layer of the formation including, but not limited to, seismic data, well data, geologic data, etc.

In one embodiment, the petroleum system model of the present invention is first applied to the oldest layer (14O) of the formation. In this example, the oldest layer of the formation is illustrated at the bottom of FIG. 1. Variables such as temperature, pressure, density and porosity, among others, are calculated by the petroleum system model for each layer of the formation. In one embodiment, the petroleum system model calculates the change in (represented by the symbol "Δ") vertical stress, pressure, porosity, density and temperature for each cell of the first layer of the formation.

Prior to analysis of the next layer of the subterranean formation, the petroleum system model communicates output data pertaining to its analysis of the first layer of the formation to a geomechanical model (27), as illustrated by Box (26). One example of a geomechanical model is VISAGE™ software, also offered by Schlumberger. The VISAGE™ software is described in greater detail in U.S. patent application Ser. No. 12/548,810, entitled "Fully Coupled Simulation for Fluid Flow and Geomechanical Properties in Oilfield Simulation Operations," filed on Aug. 27, 2009, the entirety of which is incorporated by reference herein.

Output data communicated to the geomechanical model may include all of the output generated by the petroleum system model relating to the first layer of the formation, or only a portion thereof. Further, such data may be provided directly to the geomechanical model or through one or more storage devices accessible by the geomechanical and petroleum system model. Upon receipt of the output data from the petroleum system model, the geomechanical model derives mechanical and strength properties applicable to the first layer of the formation using at least a portion of the petroleum system model output data, as illustrated by Box (28).

Petroleum system models are based on an assumption that the stress state in a basin is simple, with simplified models for vertical and horizontal stresses, which are assumed to be principal stresses, with the vertical stress being determined by the overburden weight. This approach fails to account for the role of geomechanics in terms of how horizontal stresses can exert a major influence on basin processes.

In one embodiment, the mechanical properties derived by the geomechanical model include, but are not limited to, Young's Modulus and Poisson's Ratio, and strength properties include, but are not limited to, friction angle and cohesion. The derived mechanical and strength properties of the formation are used by the geomechanical model to calculate stress and strain variations associated with the first layer of the subterranean formation. In one embodiment, the geomechanical model may utilize uniaxial, triaxial, Brazilian and Scratch tests, as well as log data together with measured or computed Young's moduli and Poissons ratios, to compute stress and strain for each layer of the formation.

The geomechanical model of the present invention utilizes the derived mechanical and strength properties to perform additional geomechanical calculations pertaining to the first layer of the formation, as illustrated by Box (30) of FIG. 2. In one embodiment, output data generated by the geomechanical model at this step includes stress and strain variation values for each cell of the formation of the first layer, as illustrated by Box (32). In one embodiment, the geomechanical model calculates the change in (represented by the symbol "Δ") stress and strain for each cell of the first layer of the formation.

In one embodiment, the present invention validates and cross-references data generated by both models, i.e., petroleum system and geomechanical, for each layer of the formation. By cross-referencing results for each layer of the formation, improved reliability estimates of petroleum charge and mechanical seal integrity for geological features may be produced. In one embodiment, the validation process utilized by the present invention includes the use of one or more convergence thresholds. Convergence thresholds are used to increase the reliability and accuracy of computer simulation data relating to each layer of the formation.

If such threshold(s) are not met during analysis of a layer of the formation, the analysis of the layer at issue may be repeated through iteration until the desired convergence is reached. Such thresholds may be pre-programmed into the system or entered by one or more users (34U). In one embodiment, the present invention determines whether a user defined convergence threshold has been provided to the system, as illustrated by Box (34).

If no user defined threshold is provided, the present invention may retrieve "default" or pre-programmed threshold value(s) as illustrated by Box (36). If a user-defined threshold is available, the threshold is retrieved by the system, as illustrated by Box (38). Threshold values may take the form of any suitable value or variation and may be entered by the user or pre-programmed into the system. In one embodiment, a percentage variance (%) is utilized to determine if the desired convergence has been reached.

Once received, thresholds are applied and data from both models is cross referenced in order to validate the data with respect to the first layer of the formation prior to analysis of subsequent layers, as illustrated by Boxes (40) and (42). In one embodiment, the present invention compares change in porosity values generated by the petroleum system model to change in volumetric strain values generated by the geomechanical model in order to determine if the desired convergence has been achieved.

In this example, if the change in porosity values generated by the petroleum system model do not converge with the change in volumetric strain values generated by the geomechanical model within the desired threshold(s), the analysis of the layer is repeated through iteration until the desired convergence is reached, as illustrated by Boxes (44) and (46). In this example, the combined data generated by the petroleum system model and the geomechanical model is returned to the petroleum system model for use in re-analyzing the first layer of the formation in an effort to improve convergence between the two models.

In one embodiment, the results of the validation process may be displayed to the user upon a display device. This feature of the present invention readily informs the user of the validation, or lack thereof, and also allows the user to amend or revise the threshold(s) used by the system.

A maximum number of iterations for each layer, in the event of unacceptable convergence, may be pre-programmed into the system or entered into the system by the user. For example, the maximum number of iterations for the first layer of the formation may be set to four (4) iterations. In this example, if the desired convergence is not reached after four iterations, the system would proceed to analyze subsequent layers of the formation even though the desired convergence is not achieved.

It should be noted that more sophisticated standards may be implemented to improve or accelerate the convergence through iteration. For example, the iterative process of the present invention may be accelerated using Atkins accelerator programs.

When the desired convergence is reached, the combined data generated by the petroleum system model and the geomechanical model is returned to the petroleum system model, as illustrated by Box (48). The data is then used by the petroleum system model to analyze another layer of the formation, as illustrated by Box (50). The analysis and validation process described above is then repeated for the second layer of the formation and so on until all layers of the formation have been analyzed by the petroleum system and geomechanical model, as illustrated by Box (52).

Figure 3:
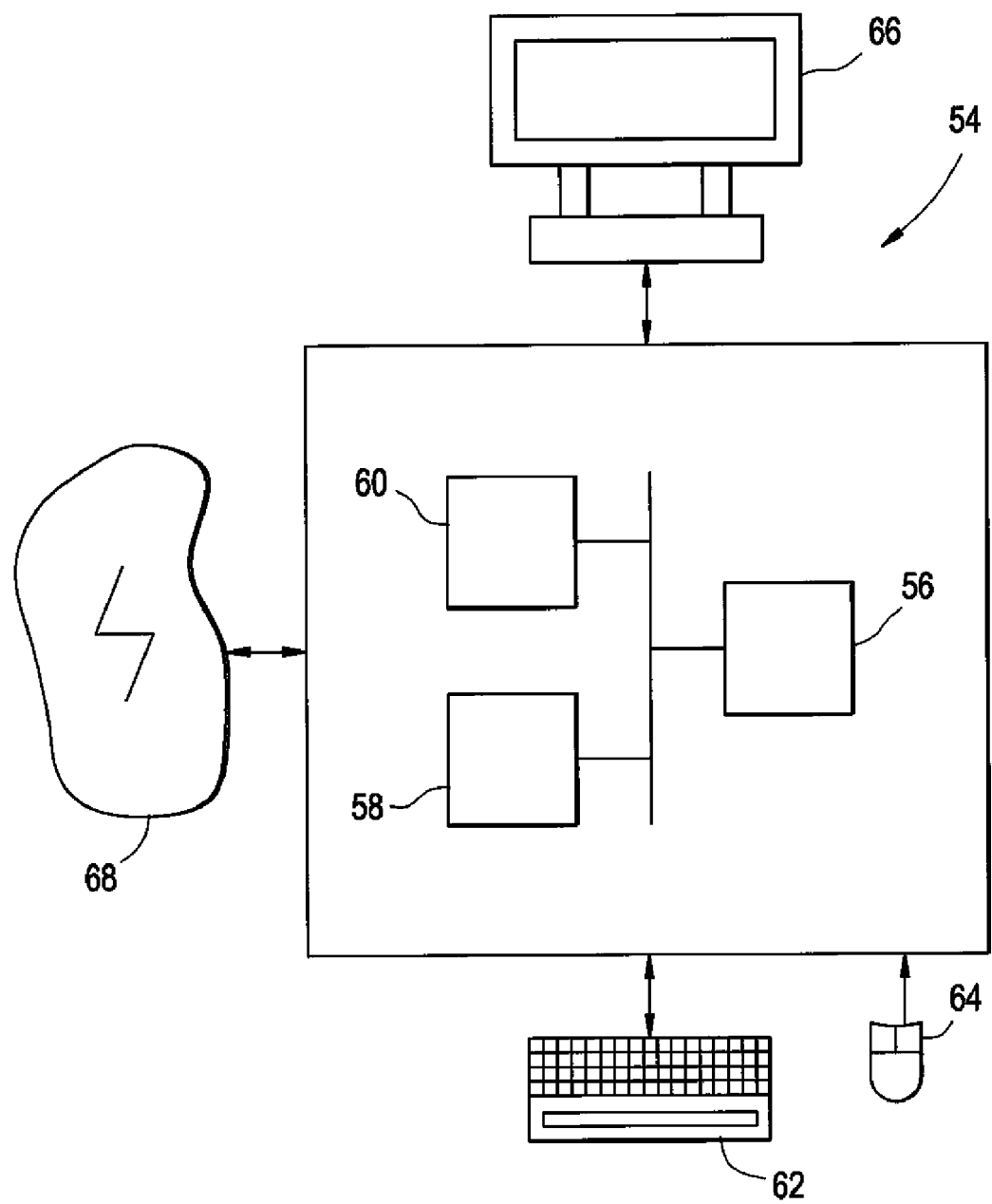
FIG. 3 is a component diagram illustrating an example computer system that may be utilized in conjunction with one embodiment of the present invention.

The present invention may be implemented on virtually any type of computer regardless of the platform being used. Referring to FIG. 3, a computer system (54) includes a processor (56), associated memory (58), a storage device (60), and numerous other elements and functionalities typical of modern computers (not shown). The computer (54) may also include input devices, such as a keyboard (62) and a mouse (64), and output devices, such as a display monitor (66). The computer system (54) may be connected to a local area network (LAN) or a wide area network (e.g., the Internet) (68) via a network interface connection (not shown). Those skilled in the art will appreciate that these input and output devices may take other forms, now known or later developed. Further, those skilled in the art will appreciate that one or more elements of the aforementioned computer system (54) may be located at a remote location and connected to the other elements over a network.

The invention may be implemented on a distributed system having a plurality of individual computer systems, where each portion of the invention may be located on a different system within the distributed system. The present invention may also be implemented upon a hand-held or other portable computing device. Further, software instructions to perform embodiments of the invention may be stored on a computer readable medium such as a compact disc (CD), DVD, diskette, tape, file, hard drive, flash drive, SD memory card, or any other suitable computer readable storage device.

While various embodiments of the present invention for integrating petroleum systems and geomechanical earth models are described with reference to facilitating the exploration phase of hydrocarbon recovery, it is understood by those skilled in the art that other embodiments of systems and methods for petroleum system and geomechanical model integration may be used for facilitation of decision making in other phases of recovery as well (e.g., drilling and production).

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

What is claimed is:

1. A method of modeling a subterranean formation comprising the steps of:
providing a petroleum system model of the subterranean formation;
providing a geomechanical model of the subterranean formation, the geomechanical model being in communication with the petroleum system model;
applying the petroleum system model to a first layer of the subterranean formation; the petroleum system model generating a first set of output data pertaining to the first layer of the subterranean formation;
communicating the first set of output data to the geomechanical model;
applying the geomechanical model to the first layer of the subterranean formation; the geomechanical model utilizing at least a portion of the first set of output data generated by the petroleum system model and generating a second set of output data pertaining to the first layer of the subterranean formation; and
validating at least a portion of the first set of output data using at least a portion of the second set of output data prior to applying the petroleum system model or the geomechanical model to another layer of the subterranean formation.

2. The method of claim 1, wherein the first layer comprises the oldest geologic time step of the subterranean formation.

3. The method of claim 2, further comprising the additional step of:
validating at least a portion of the first set of output data using at least a portion of the second set of output data through iteration.

4. The method of claim 3, wherein the first set of output data further comprises change in porosity data and the second set of output data further comprises change in volumetric strain data.

5. The method of claim 4, wherein the validation step further comprises:
receiving a user defined tolerance between the change in porosity data and the change in volumetric strain data; and
applying the user defined tolerance to change in porosity data and change in volumetric strain.

6. The method of claim 5, further comprising the additional steps of:
  if the user defined tolerance is not achieved, communicating the second set of output data to the petroleum system model; and
  re-applying the petroleum system model to the first layer of the subterranean formation utilizing at least a portion of the second set of output data until the user defined tolerance is achieved.

7. The method of claim 6, further comprising the additional steps of:
  communicating the second set of output data to the petroleum system model; and
  applying the petroleum system model to the first layer and at least one additional layer of the subterranean formation, the petroleum system model utilizing at least a portion of the first set of output data and at least a portion of the second set of output data.

8. A non-transitory computer-readable storage medium for modeling a subterranean formation comprising instructions which, when executed, cause a computing device to:
  apply a petroleum system model to a first layer of the subterranean formation; the petroleum system model generating a first set of output data pertaining to the first layer of the subterranean formation;
  communicate the first set of output data to a geomechanical model;
  apply the geomechanical model to the first layer of the subterranean formation; the geomechanical model utilizing at least a portion of the first set of output data generated by the petroleum system model and generating a second set of output data pertaining to the first layer of the subterranean formation; and
  validate at least a portion of the first set of output data using at least a portion of the second set of output data prior to applying the petroleum system model or the geomechanical model to another layer of the subterranean formation.

9. The non-transitory computer-readable storage medium of claim 8, wherein the first layer comprises the oldest geologic time step of the subterranean formation.

10. The non-transitory computer-readable storage medium of claim 9, wherein the instructions, when executed, cause the computing device to:
  validate at least a portion of the first set of output data using at least a portion of the second set of output data through iteration.

11. The non-transitory computer-readable storage medium of claim 10, wherein the first set of output data further comprises change in porosity data and the second set of output data further comprises change in volumetric strain data.

12. The non-transitory computer-readable storage medium of claim 11, wherein the instructions, when executed, cause the computing device to:
  receive a user defined tolerance between the change in porosity data and the change in volumetric strain data; and
  apply the user defined tolerance to change in porosity data and change in volumetric strain.

13. The non-transitory computer-readable storage medium of claim 12, wherein the instructions, when executed, cause the computing device to:
  if the user defined tolerance is not achieved, communicate the second set of output data to the petroleum system model; and
  re-apply the petroleum system model to the first layer of the subterranean formation utilizing at least a portion of the second set of output data until the user defined tolerance is achieved.

14. The non-transitory computer-readable storage medium of claim 13, wherein the instructions, when executed, cause the computing device to:
  communicate the second set of output data to the petroleum system model; and
  apply the petroleum system model to the first layer and at least one additional layer of the subterranean formation, the petroleum system model utilizing at least a portion of the first set of output data and at least a portion of the second set of output data.

15. A subterranean modeling system comprising:
  a computer system having a processor configured to apply a petroleum system model to a first layer of a subterranean formation; the petroleum system model generating a first set of output data pertaining to the first layer of the subterranean formation;
  communicate the first set of output data to a geomechanical model;
  apply the geomechanical model to the first layer of the subterranean formation; the geomechanical model utilizing at least a portion of the first set of output data generated by the petroleum system model and generating a second set of output data pertaining to the first layer of the subterranean formation; and
  validate at least a portion of the first set of output data using at least a portion of the second set of output data prior to applying the petroleum system model or the geomechanical model to another layer of the subterranean formation.

16. The subterranean modeling system of claim 15, wherein the first layer comprises the oldest geologic time step of the subterranean formation.

17. The subterranean modeling system of claim 16, wherein the processor is configured to:
  validate at least a portion of the first set of output data using at least a portion of the second set of output data through iteration.

18. The subterranean modeling system of claim 17, wherein the first set of output data further comprises change in porosity data and the second set of output data further comprises change in volumetric strain data.

19. The subterranean modeling system of claim 18, wherein the processor is configured to:
  receive a user defined tolerance between the change in porosity data and the change in volumetric strain data; and
  apply the user defined tolerance to the change in porosity data and the change in volumetric strain.

20. The subterranean modeling system of claim 19, wherein the processor is configured to:
  if the user defined tolerance is not achieved, communicate the second set of output data to the petroleum system model; and
  re-apply the petroleum system model to the first layer of the subterranean formation utilizing at least a portion of the second set of output data until the user defined tolerance is achieved.

21. The subterranean modeling system of claim 20, wherein the processor is configured to:
  communicate the second set of output data to the petroleum system model; and
  apply the petroleum system model to the first layer and at least one additional layer of the subterranean formation, the petroleum system model utilizing at least a portion of the first set of output data and at least a portion of the second set of output data.

* * * * *